(12) United States Patent
Bhattiprolu et al.

(10) Patent No.: US 9,380,000 B2
(45) Date of Patent: *Jun. 28, 2016

(54) DEPLOYING AND MODIFYING A SERVICE-ORIENTED ARCHITECTURE DEPLOYMENT ENVIRONMENT MODEL

(71) Applicant: International Business Machines Corporation, Armonk, NY (US)

(72) Inventors: Srikanth Bhattiprolu, Santa Clara, CA (US); Xiang Yu Cai, Beijing (CN); Rui Liang, Beijing (CN); Jun Jie Nan, Beijing (CN); Piotr Przybylski, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 291 days.

This patent is subject to a terminal disclaimer.

(21) Appl. No.: 13/869,133

(22) Filed: Apr. 24, 2013

(65) Prior Publication Data

US 2013/0282908 A1   Oct. 24, 2013

(30) Foreign Application Priority Data

Apr. 24, 2012 (CN) .......................... 2012 1 0122163

(51) Int. Cl.
   *H04L 12/911* (2013.01)
   *H04L 12/801* (2013.01)
   *G06F 9/44* (2006.01)

(52) U.S. Cl.
   CPC ........ *H04L 47/82* (2013.01); *G06F 8/36* (2013.01); *H04L 47/127* (2013.01)

(58) Field of Classification Search
   CPC .......... G06F 8/60; G06F 8/10; G06F 9/44505
   USPC ................ 717/120; 703/22; 706/48; 709/226
   See application file for complete search history.

(56) References Cited

U.S. PATENT DOCUMENTS

| | | |
|---|---|---|
| 7,363,211 B1 | 4/2008 | Naganathan et al. |
| 7,512,942 B2 | 3/2009 | Brown et al. |

(Continued)

FOREIGN PATENT DOCUMENTS

| | | |
|---|---|---|
| CN | 101441560 A | 5/2009 |
| CN | 102034151 A | 4/2011 |

(Continued)

OTHER PUBLICATIONS

Arnold et al., "Pattern Based SOA Deployment", ICSOC Proceedings of the 5th International Conference on Service Oriented Computing, vol. 4749, copyright Sep. 2007, pp. 1-12.

(Continued)

*Primary Examiner* — Oleg Survillo
*Assistant Examiner* — Christopher Cadorna
(74) *Attorney, Agent, or Firm* — Yee & Associates, P.C.; Parashos Kalaitzis

(57) ABSTRACT

A system for deploying a Service-Oriented Architecture (SOA) deployment environment model and a system for modifying a deployed SOA deployment environment model. In the deploying system, deployment of the SOA deployment environment model is realized by acquiring a task list including tasks for deploying elements of the model, associating the tasks in the task list with the elements, and executing the tasks to deploy the elements of the model. In the modifying system, modification of the SOA deployment environment model is realized by acquiring a task list including tasks for modifying elements of the model, associating the tasks in the task list with the elements, and executing the tasks to modify the elements. Thus, the deployment of the SOA deployment environment model and the modification of the deployed SOA deployment environment model may be realized in a simple and easy-to-implement manner.

9 Claims, 3 Drawing Sheets

(56) References Cited

U.S. PATENT DOCUMENTS

| | | |
|---|---|---|
| 7,912,870 B2 | 3/2011 | Chancey et al. |
| 8,291,378 B2 | 10/2012 | Arnold et al. |
| 8,302,093 B2 | 10/2012 | Berg et al. |
| 8,352,912 B2 | 1/2013 | Bhatkhande et al. |
| 8,417,658 B2 | 4/2013 | Arnold et al. |
| 9,032,359 B1 * | 5/2015 | Ahmad ............... G06F 8/70 717/100 |
| 2007/0055972 A1 | 3/2007 | Brown et al. |
| 2008/0189679 A1 * | 8/2008 | Rodriguez et al. ............ 717/105 |
| 2008/0215358 A1 * | 9/2008 | Goldszmidt et al. .............. 705/1 |
| 2009/0113382 A1 | 4/2009 | Chancey et al. |
| 2009/0138940 A1 | 5/2009 | Liu et al. |
| 2009/0319239 A1 | 12/2009 | Arnold et al. |
| 2010/0031247 A1 | 2/2010 | Arnold et al. |
| 2010/0058331 A1 | 3/2010 | Berg et al. |
| 2010/0070449 A1 | 3/2010 | Arnold et al. |
| 2010/0153916 A1 | 6/2010 | Bhatkhande et al. |
| 2011/0196659 A1 | 8/2011 | Salle et al. |

FOREIGN PATENT DOCUMENTS

| | | |
|---|---|---|
| CN | 102203767 A | 9/2011 |
| CN | 102314358 A | 1/2012 |

OTHER PUBLICATIONS

Luo et al., "Declarative Constraint Framework for SOA Deployment and Configuration", IEEE International Conference on Web Services, Sep. 2008, pp. 637-644.

Bhattiprolu et al., "Method and System for Deploying and Modifying a Service-Oriented Architecture Deployment Environment," U.S. Appl. No. 14/487,327, filed Sep. 16, 2014, 35 pages.

Final Office Action, dated Sep. 15, 2015, regarding U.S. Appl. No. 14/487,327, 22 pages.

Office Action, dated Apr. 23, 2015, regarding U.S. Appl. No. 14/487,327, 22 pages.

Notice of Allowance, dated Mar. 31, 2016, regarding U.S. Appl. No. 14/487,327, 18 pages.

* cited by examiner

DEPLOYING AND MODIFYING A SERVICE-ORIENTED ARCHITECTURE DEPLOYMENT ENVIRONMENT MODEL

CROSS-REFERENCE TO RELATED APPLICATION(S)

This application claims the benefit of priority to Chinese Patent Application Serial No. 201210122163.8 filed on Apr. 24, 2012, the contents of which are hereby incorporated by reference.

BACKGROUND

The present invention relates to Service-Oriented Architecture (SOA) deployment environment modeling, and more specifically, to a method and a system for deploying a SOA deployment environment model in a business management environment, and a method and a system for modifying a deployed SOA deployment environment model.

In the field of business management, a number of methods for building a deployment environment model (hereinafter, SOA deployment environment model) under a Service-Oriented Architecture (SOA) have been proposed, including top-down modeling methods and bottom-up modeling methods. However, how to deploy the SOA deployment environment model to a deployment target is still a problem.

Moreover, a dynamic change of business often causes a change of a deployment environment (or referred to as "topology"). In order to make a deployment environment model (or referred to as "topology model") describing such deployment environment adaptive to the change of business, the deployed deployment environment model should be modified correspondingly. In addition, SOA itself has an ability to adapt to changes, so the SOA deployment management is also required to have this ability. However, in order to modify/redeploy the deployed deployment environment model according to the change of business, the current methods need to design complex logics to detect whether a target object of the deployment environment model has been generated, and then determine whether the target object needs to be generated/regenerated. The logics are too complex to implement.

Therefore, there is a need for a method and a system for deploying a SOA deployment environment model and modifying the deployed SOA deployment environment model in a simple and easy-to-implement manner.

SUMMARY

The present invention is proposed in view of the above problem. The present invention provides a method and a system for deploying a SOA deployment environment model, and a method and system for modifying a deployed SOA deployment environment model, which can deploy a SOA deployment environment model and modify a deployed SOA deployment environment model in a simple and easy-to-implement manner without the need of complex logics.

According to one embodiment of the present invention, there is provided a method for deploying a SOA deployment environment model, comprising: acquiring a task list including tasks for deploying elements of the SOA deployment environment model; associating the tasks in the task list with the elements; and executing the tasks in the task list to deploy the elements of the SOA deployment environment model, so as to realize deployment of the SOA deployment environment model.

According to another embodiment of the present invention, there is provided a method for modifying a deployed SOA deployment environment model, comprising: acquiring a task list including tasks for modifying elements of the SOA deployment environment model; associating the tasks in the task list with the elements; and executing the tasks in the task list to modify the elements of the SOA deployment environment model, so as to realize modification of the SOA deployment environment model.

According to another embodiment of the present invention, there is provided a system for deploying a SOA deployment environment model, comprising: acquiring means configured to acquire a task list including tasks for deploying elements of the SOA deployment environment model; association means configured to associate the tasks in the task list with the elements; and executing means configured to execute the tasks in the task list to deploy the elements of the SOA deployment environment model, so as to realize deployment of the SOA deployment environment model.

According to another embodiment of the present invention, there is provided a system for modifying a deployed SOA deployment environment model, comprising: acquiring means configured to acquire a task list including tasks for modifying elements of the SOA deployment environment model; association means configured to associate the tasks in the task list with the elements; and executing means configured to execute the tasks in the task list to modify the elements of the SOA deployment environment model, so as to realize modification of the SOA deployment environment model.

The above methods and systems according to the embodiments of the present invention can deploy a SOA deployment environment model in a top-down manner and modify the deployed SOA deployment environment model, so that the deployed SOA deployment environment model can adapt to a dynamic change of business. Moreover, the above methods and systems according to the embodiments of the present invention realize deployment and modification of the SOA deployment environment model by acquiring, associating and executing tasks, which does not need complex logics and is easy to implement.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
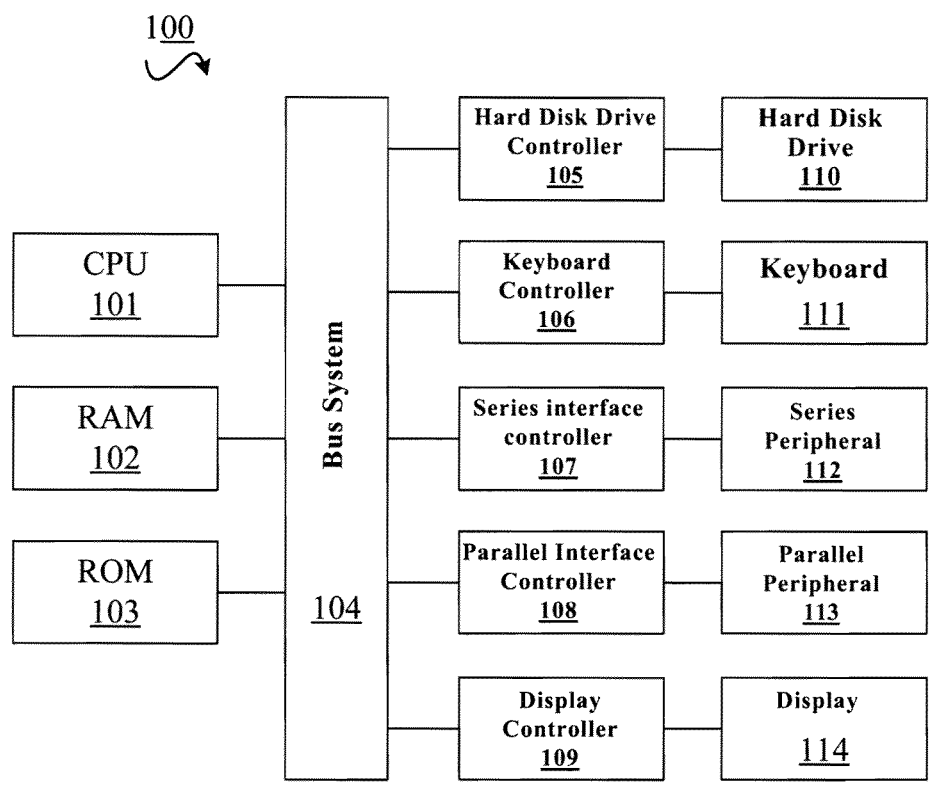
FIG. 1 shows an exemplary computer system 100 which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The method and the system for deploying a SOA deployment environment model according to the embodiments of the present invention, and the method and the system for modifying a deployed SOA deployment environment model according to the embodiments of the present invention, will be described below with reference to FIGS. 2-7.

In the embodiments of the present invention, a new element, i.e. a task associated with an element of a SOA deployment environment model, is introduced into the SOA deployment environment model. In brief, deployment of the deployment environment model and modification of the deployed deployment environment model may be realized by creating the task, adding the task into the SOA deployment environment model, and executing the task.

Hereinafter, a detailed description will be given to the "task" introduced into the SOA deployment environment model.

The SOA deployment environment model may include a variety of elements, such as roles and components, etc. The components are units for providing various functions and/or services, and can be organized into a component tier and added to corresponding roles. The roles can be organized into a role tier and mapped to a corresponding deployment object. The deployment object may be, for example, one or more distributed application servers or a cluster of application servers. The deployment of the SOA deployment environment model is realized by deploying the respective elements of the deployment environment model.

Figure 2:
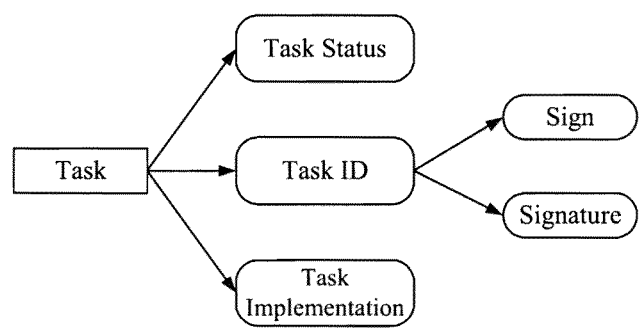
FIG. 2 is a diagram for describing a task according to the embodiments of the present invention.

As described above, in the embodiments of the present inventions, the task is introduced to realize the deployment and modification of the SOA deployment environment model. The task is an element capable of describing itself, that is, the task can describe itself by its parameters. In the embodiment, as shown in FIG. 2, the task may describe itself by three parameters, "Task Status", "Task ID" and "Task Implementation". These parameters can be set by a developer.

"Task Status" is used to indicate completion statuses of the task, that is, whether the task has been completed. In the embodiment, two statuses, "Done" and "Incomplete", may be set for the task. "Done" represents that the task has been completed, and "Incomplete" represents that the task has not been completed. By setting "Task Status", it is possible to execute only tasks with an "Incomplete" status and skip tasks with a "Done" status when the SOA deployment environment model is deployed and modified, so as to avoid unnecessarily repeated execution of some tasks and thereby improve the operation efficiency. Of course, "Task Status" of the task is not limited to the above two statuses, and in another embodiment of the present invention, the task can be given other types and number of task statuses, such as "Done", "Executing", and "Not Executed", etc.

"Task ID" indicates an action of the task and an operation type for the action. In the embodiment, as shown in FIG. 2, "Task ID" may further include two sub-parameters, "Sign" and "Signature", and the action of the task and the operation for the action are described by the two sub-parameters.

"Sign" describes the operation type for the action of the task, that is, describes doing the action (Do) or undoing the action which has been performed (on the SOA deployment environment model or the elements thereof) (Undo). For example, "Sign" may be a positive sign "+" or a negative sign "−", where the positive sign "+" represents doing the action, and the negative sign "−" represents undoing the action which has been performed. It is to be appreciated that the operation type for the action of the task also may be represented in any other manners than the positive sign and the negative sign, for example, by using different values corresponding to "Do" and "Undo", respectively.

"Signature" describes the action of the task. In particular, "Signature" of the task is used to describe that the task is to perform what action on what object (for example, which element of the SOA deployment environment model), and it reflects the relationship between the action of the task and the element of the SOA deployment environment model. The developer may define the action which can be supported by the task and is described in "Signature" of the task according to actual needs. For example, the developer can define by himself deployment environment management actions which may be necessary to be performed, according to the type of the SOA deployment environment model to be deployed, and describe these actions in "Signature" of corresponding tasks when creating the tasks. For example, "Signature" can describe the following actions:

Add WHAT to WHERE,
Update/modify WHAT of WHO, or update/modify WHAT,
Generate WHAT,
Map WHAT to WHERE, and
Other deployment environment management actions.

By combining "Sign" and "Signature", the task may support doing/undoing of a variety of actions. For example, for deployment of a SOA deployment environment model and modification of a deployed SOA deployment environment model, the combination of "Sign" and "Signature" may enable the task to support the following particular actions:

Generate a role,
Generate a component,
Generate a deployment object,
Generate a SOA deployment environment model,
Add a role to a role tier based on a deployment environment pattern (or referred to as topology pattern),
Undo the adding action: remove the role from the role tier,
Add a component to a corresponding role,
Undo the adding action: remove the component from the role,
Map a role to a deployment object,
Undo the mapping action: undo the mapping of the role to the deployment object,
Update/modify a name or other properties of an element of a deployment environment module,
Undo the updating action: roll back the update/modification, and
Other deployment environment management actions.

It is to be noted that, during the process of deploying/modifying a SOA deployment environment model, it may be necessary to create multiple tasks. In this case, two tasks having the same signature but different signs may appear. At this time, the two tasks may be combined, which will cause both of the two tasks to be deleted without being executed.

In the above embodiment, two sub-parameters, "Sign" and "Signature", are used to describe the action of the task and the operation type for the action, so that the task may do a variety of actions or undo a variety of actions which have been performed. However, this is only exemplary. In another embodiment, it is possible to use only "Signature" or a single similar sub-parameter to describe the action of the task and the operation type for the action, where "Do a certain action" and "Undo the certain action which has been performed" are described respectively as two different types of actions in "Signature" or the sub-parameter. In a still another embodiment, the action of the task and the operation type for the action may be described by using more sub-parameters.

"Task Implementation" is used to describe how to complete the action of the task, that is, describe a specific manner for performing the action. In particular, since the action of the task is designed and defined by the developer, and the developer knows how to complete the action, the developer gives the manner for completing the action in "Task Implementation" when creating the task, besides setting "Task Status" and "Task ID" describing the action of the task. For example, for a task which is to perform an action common in the art for deploying a SOA deployment environment model and modifying the deployed model, the developer may choose to execute the task in the manner commonly used in the art or in the manner designed by the developer himself, and gives a corresponding direction in "Task Implementation" of the task; and for a task performing an action designed by the developer himself, the developer may also gives a corresponding direction specifically in "Task Implementation" of the task. For example, the developer may specify programming classes or commands required to be invoked to complete the action, parameters to be transferred during execution of the action, and/or other necessary information and operations, so that the executor of the task (e.g. an executing apparatus or an application server) can complete the task by simply performing operations according to the direction in "Task Implementation".

As an example, for a task "Generate a deployment object", the developer may specify commands to be invoked when the task is executed in "Task Implementation" of the task, such as commands used to create an application server with parameters including a server name, a server location and other properties. Thus, by invoking and executing the commands, the task may be completed, and the deployment object may be created. As another example, for a task "Generate a SOA deployment environment model", in the case where the SOA deployment environment model is described in eXtensible Markup Language (XML), and a template file for the SOA deployment environment model has been defined in advance, the developer may specify, in "Task Implementation" of the task, invoking the template file, and creating an XML instance by setting variables/properties of the SOA deployment environment model with values specified by a user or the developer based on the template file, thereby completing the task.

By setting the above parameters, the created task can realize self-description, that is, can indicate completion statuses of its own, the action to be done or undone and the object on which the action is performed, and how to execute the action, etc. It is to be appreciated that the respective parameters described above are only exemplary, not limitative. More or less other parameter can be set for the task instead of the above parameters, as long as the created task can realize self-description.

Hereinafter, the method for deploying a SOA deployment environment model according to an embodiment of the present invention will be described with reference to FIG. 3.

In the scene of deploying a SOA deployment environment model, the deployment environment model is generated in advance and then is deployed. The type of the deployment environment (topology) to be generated, such as the types and numbers of elements necessary to be included, etc., may be determined according to a certain predetermined deployment environment pattern (or referred to as topology pattern), and accordingly the SOA deployment environment model describing the deployment environment is generated. The predetermined deployment environment pattern may be any suitable deployment environment pattern selected by the developer according to actual situations of business management. The method for generating the SOA deployment environment model according to the deployment environment pattern is commonly known in the art, and a detailed description thereof is omitted herein for simplicity.

Figure 3:
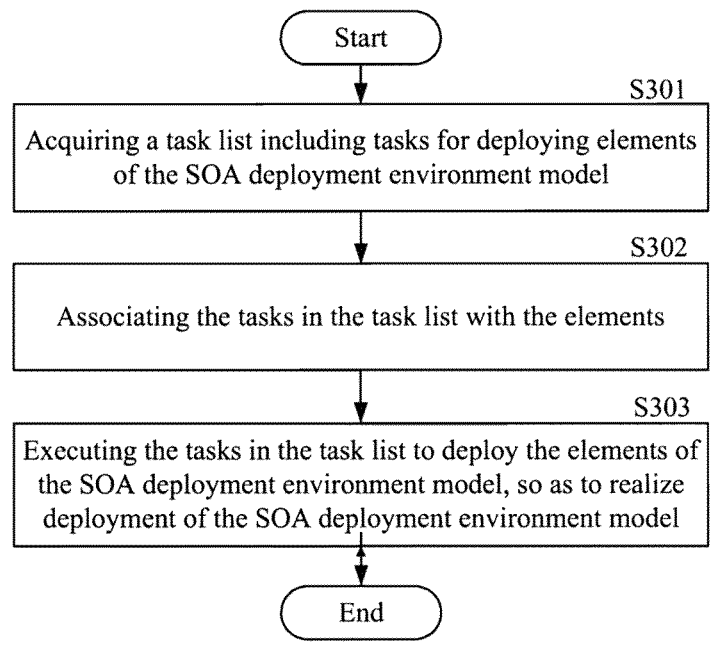
FIG. 3 is a flow diagram showing a method for deploying a SOA deployment environment model according to an embodiment of the present invention.

For the SOA deployment environment model to be deployed, as shown in FIG. 3, a task list including tasks for deploying elements of the SOA deployment environment model is acquired in step S301.

The task list may be created by, for example, the developer in advance, so the above acquiring operation can be performed by receiving the task list created by the developer. As described above, the deployment of the SOA deployment environment model is implemented by deploying each element of the model. Therefore, in order to deploy the SOA deployment environment model, tasks for deploying the elements of the model may be created in advance, for example, tasks for deploying roles, tasks for deploying components, and the like. It is to be noted that a task for deploying an element of the SOA deployment environment model can be further divided into one or more tasks, according to different element types and task types. For example, a task for deploying a role can be further divided into a plurality of tasks including a task for generating the role, a task for adding the role into a role pattern, and a task for mapping the role to a deployment object, and the like. In this way, at least one task created for each element of the SOA deployment environment model, and tasks created for different elements constitute a task list.

For the deployment of the SOA deployment environment model, parameters of each created task may be set initially as follows:
 (1) Set "Task Status" to "Incomplete", because the task has not been executed;
 (2) Set "Sign" of "Task ID" to "positive sign (+)" to indicate that an action of the task is to be performed;
 (3) Set "Signature" of "Task ID" to the action of the task, for example, "Generate a role", "Add the role into a role pattern", "Map the role to a deployment object", "Generate a component", and "Add the component to a corresponding role", and the like; and
 (4) Set "Task Implementation" in the above-mentioned manner to describe how to perform the action of the task.

Next, in step S302, the tasks in the task list are associated with the elements of the SOA deployment environment model. Thereby, the task list can be added into the SOA deployment environment model. Specifically, since an object on which an action of each task in the task list is performed (i.e. an element of the SOA deployment environment model) has been described in "Signature" of the task, the task may be associated with a corresponding element according to the description in its "Signature". For example, a task for generating a role may be associated with the role to be generated, and a task for adding a component to a role may be associated with the role. In addition, the association between the tasks and the elements may be implemented by using measures commonly used in the art. For example, in the case where the SOA deployment environment model is described in eXtensible Markup Language (XML), a new property (or a sub-element), "Task", may be added into XML codes describing an element of the model, and the "Task" points to the task corresponding to the element, so as to implement the association between the element and the corresponding task. In the case where the SOA deployment environment model is described in other languages, the association can be similarly implemented by setting a tag which points to the corresponding task for the element of the model.

Then, in step S303, the tasks in the task list are executed to deploy the elements of the SOA deployment environment model, so as to realize the deployment of the SOA deployment environment model.

As described above, "Task Implementation" of a task describes how to complete the task (i.e. the manner of performing an action of the task). Therefore, in step S303, each task can be completed by performing the action of the task in accordance with directions in "Task Implementation" of the task. Since the tasks in the task list are created for deploying the SOA deployment environment model, the deployment of the elements of the model will be realized after all of the tasks in the task list have been executed, so that the deployment of the deployment environment model is realized. In case where there are a plurality of tasks, some tasks may be executed sequentially or in parallel according to actual situations. It is to be noted that "Task Status" of a task may be checked when the task is executed; the task is skipped without being executed if "Task Status" thereof is "Done"; on the contrary, if "Task Status" of the task is "Incomplete", the task is executed, and "Task Status" thereof is modified into "Done" upon completion of the execution of the task.

As a particular example for deploying a SOA deployment environment model by using the above method, a task list can be created, which includes at least the following tasks for deploying elements of the deployment environment model:

(1) A task "Generate a role" and a task "Add the role to a role tier";
(2) A task "Generate a component" and a task "Add the component to the role"; and
(3) A task "Map the role to a deployment object".

The developer may determine how to complete the actions of "Generate a role", "Add the role to a role tier", "Generate a component", "Add the component to the role" and "Map the role to a deployment object" in the manner commonly used in the art, or in the manner designed by the developer himself according to actual needs, and performing corresponding settings in "Task ID" of the respective tasks.

The following results can be obtained by associating the above-mentioned tasks with the corresponding elements (role tiers, roles, components, deployment objects, and the like), and executing these tasks in the manners described in "Task Implementation" thereof:

(1) As a result of executing the task "Generate a role" and the task "Add the role to a role tier", the role is generated, which is included in a deployment environment pattern and added to the role tier;
(2) As a result of executing the task "Generate a component" and the task "Add the component to the role", the component is generated and added to the corresponding role; and
(3) As a result of executing the task "Map the role to a deployment object", the role is deployed on the designated deployment object by being mapping thereto.

In this way, the deployment of roles and components, and accordingly the deployment of the SOA deployment environment model including these roles and components, can be easily realized by creating/acquiring, associating and executing the tasks.

Figure 4:
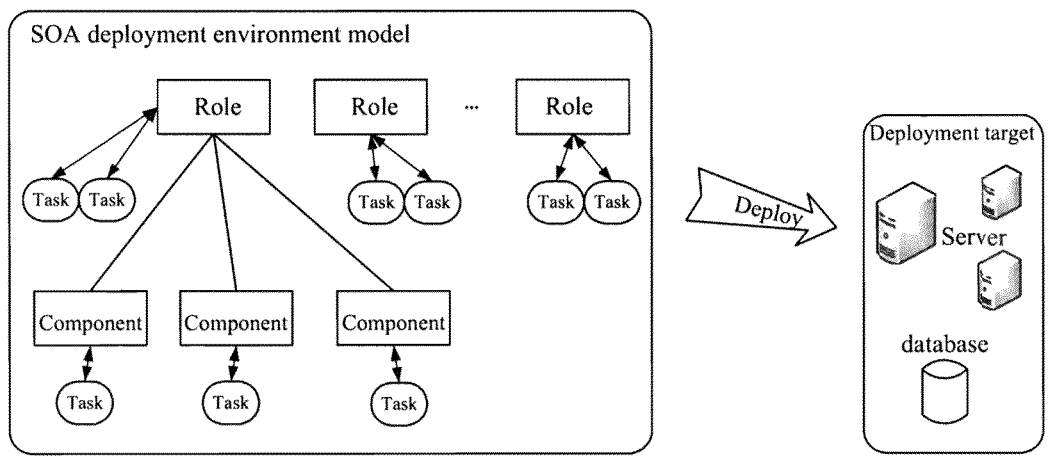
FIG. 4 is a diagram schematically showing a deployed SOA deployment environment model according to an embodiment of the present invention.

FIG. 4 shows an example of a deployed SOA deployment environment model according to an embodiment of the present invention. As shown in FIG. 4, the deployment environment model includes a plurality of roles and a plurality of components (only three components are shown for simplicity), where each role can include one or more components. During the process of deploying the SOA deployment environment model shown in FIG. 4, at least one task acquired from, for example, the developer and generated for each of elements (roles and components) in the model is associated to a corresponding element in the model (as shown by the double-headed arrows in FIG. 4), so as to add a task list formed by these tasks into the model. Therefore, as shown in FIG. 4, corresponding tasks are attached to the respective roles and components, respectively. The SOA deployment environment model can be deployed on the deployment object such as a server or a database by execution of the respective tasks.

By introducing self-described tasks into a SOA deployment environment model and executing these tasks, the above deployment method according to the embodiment of the present invention can realize top-down deployment of the SOA deployment environment model in a simple and east-to-implement manner.

As described above, as business often changes after the SOA deployment environment model is deployed, it is required to make corresponding modification/update to the deployed SOA deployment environment model. The method for modifying a deployed SOA deployment environment model according to an embodiment of the present invention can realize this modification/update easily.

Hereinafter, the method for modifying a deployed SOA deployment environment model according to an embodiment of the present invention will be described with reference to FIG. 5.

Figure 5:
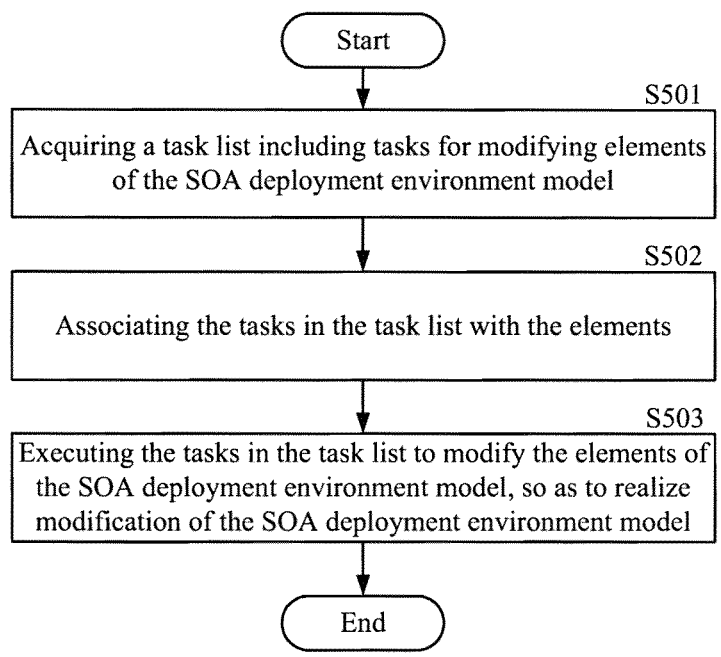
FIG. 5 is a flow diagram showing a method for modifying a deployed SOA deployment environment model according to an embodiment of the present invention.

When it is intended to modify the deployed SOA deployment environment model, as shown in FIG. 5, in step S501, a task list is acquired, which includes tasks for modifying elements of the SOA deployment environment model.

Specifically, the elements to be modified/updated in the deployed SOA deployment environment model can be determined according to the change of the business. For example, it may be necessary to add new roles, add new components, modify properties of existing roles or components, modify mapping relationship of roles or components, or the like. Corresponding tasks may be created by, for example, the developer for the elements to be modified. Likewise, one or more tasks may be created for each element according to the type of the modification to be performed. For example, when a new role is to be added in the deployed SOA deployment environment model, the following tasks may be created for the role: a task "Generate a role", a task "Add the role to a deployment environment pattern", a task "Map the role to a deployment object" and a task "Generate the SOA deployment environment model". A task list is formed of all of these tasks created for the respective elements to be modified. In this way, the acquiring operation can be performed by receiving this task list. Here, the task list created when the deployed SOA deployment environment model is modified is referred to as an "Incremental Task List", so as to distinguish it from the task list created previously when the SOA deployment environment model was deployed.

Likewise, the tasks in the Incremental Task List may include parameters "Task Status", "Task ID" and "Task Implementation", as shown in FIG. 2. Initially, the parameters "Task Status" of the tasks in the Incremental Task List are set to "Incomplete", because the modification has not been started. Corresponding settings can be performed in "Task ID" and "Task Implementation" of the tasks according to the type of the modification to be performed. In one example, when it is intended to modify a name of a role xx of the deployment environment model from oldName to newName, an Incremental Task List including a task "Modify the name of the role xx of the deployment environment model" can be created, in which "Task Status" of the task is set to "Incomplete", "Sign" in "Task ID" of the task is set to "+", "Signature" in "Task ID" of the task is set to "Modify the name of the role xx from oldName to newName", and a particular manner for performing the modification of the name is set in "Task Implementation" of the task. In another example, if it is intended to undo an action previously performed to add a component xxx to a role yy, an Incremental Task List including a task "Undo the addition of the component xxx to the role yy" can be created for the role, in which "Task Status" of the task is set to "Incomplete", "Sign" in "Task ID" of the task is set to "−", "Signature" in "Task ID" of the task is set to "Add the component xxx to the role yy", and a manner for completing the task is described in "Task implementation" of the task. In another example where it is intended to change a bearing capability of a certain deployment object, assuming that the original bearing capability of the deployment object is that two roles A and B are mapped to the deployment object, and now it is desired to map an existed role C to the deployment object, an Incremental Task List including a task "Map the role C to the deployment object" and a task "Generate the SOA deployment environment model" can be created for the deployment object, in which parameters "Task Status" of the two tasks are set to "Incomplete", parameters "Sign" in "Task ID" of the two tasks are set to "+", "Signature" in "Task ID" of the two tasks are set to "Map the role C to the deployment object" and "Generate the SOA deployment environment model", respectively, and manners for completing the two tasks are set in parameters "Task implementation" thereof, respectively.

In step S502, the tasks in the task list (i.e. the Incremental Task List) are associated with the elements (i.e. the elements to be modified). Thus, the task list is added into the deployed SOA deployment environment model. Similar to step S302, since objects on which the tasks are executed (the elements to be modified) have been described in "Signature" of the tasks, the tasks in the Incremental Task List can be associated to corresponding element according to the descriptions in "Signature" thereof, so that the Incremental Task List is added into the deployment environment model. At this time, the tasks in the task list created when the deployment environment model was deployed and the tasks in the Incremental Task List created when the deployment environment model is modified have been associated to the corresponding elements of the deployment environment model. As described above, the association between the tasks and the corresponding elements can be implemented by any measure commonly used in the art.

Then, in step S503, the tasks in the task list (i.e., the Incremental Task List) are executed to modify the elements of the SOA deployment environment model, so as to realize the modification of the SOA deployment environment model.

Similar to step S303, since "Task Implementation" of each task describes how to complete the task (that is, the manner for performing an action of the task), the task can be executed according to directions in "Task Implementation" of the task, so as to realize the modification of the corresponding element of the deployment environment model. For example, in the above example of adding the new role into the deployed SOA deployment environment model, the addition of the role can be realized by executing the created tasks, and accordingly the deployment environment model is re-generated/re-deployed. Likewise, In the process of execution of the tasks, the tasks with "Task Status" of "Done" (for example, the respective tasks in the task list created when the SOA deployment environment model was deployed) are not executed, only the tasks with "Task Status" of "Incomplete" (for example, the respective tasks in the Incremental Task List) are executed, and "Task Status" of the tasks is modified to "Done" after completion of execution of the tasks.

In this way, the deployed SOA deployment environment model may be modified easily and conveniently in response to the dynamic change of the business without complex logics, by creating the tasks for modifying the elements of the deployed SOA deployment environment model and executing these tasks.

In the embodiments of the present invention, various SOA deployment environment model management functions can be implemented by defining different tasks and task lists and then executing these tasks. Examples of the functions include:

Deploy/re-deploy a SOA deployment environment model;

Transform a deployment environment pattern by modifying types and numbers of roles included in a deployed deployment environment model;

Change a bearing capability of a deployment object by changing types and numbers of roles mapped to the deployment object;

Add a new component or remove an existed component from a component tier so as to modify a capability of a role including the component;

Modify properties (e.g. name and the like) of an element of the deployed SOA deployment environment model; and Other deployment environment model management functions.

Of course, the various deployment environment model management functions given herein are only exemplary, not limitative. Other types of deployment environment model management functions can be implemented by designing additional tasks and task lists.

In addition, in the embodiments of the present invention, deployment of a SOA deployment environment model and modification of a deployed SOA deployment environment model are always performed by creating/acquiring, adding and executing tasks (task lists), therefore these tasks can reflect a history of deploying and modifying the deployment environment model. It is possible to know the history of changes of the SOA deployment environment model by recording these tasks (for example, into a deployment environment model history table). Thus, it is possible to know a status of the deployment environment model and determine whether the deployment environment model has been generated/deployed or whether it is necessary to modify the deployment environment model previously deployed, by checking completion statuses of the recorded tasks in the task list. The tasks can be recorded in various manners, and an example of the deployment environment model history table is given in Table 1 below.

TABLE 1

| No. | | Signature of Task | Task Status |
|---|---|---|---|
| 1 | + | Add a role A1 to a deployment environment pattern B1 | Incomplete |
| 2 | − | Add a component A2 to a role B2 | Done |
| 3 | + | Map a role A3 to a deployment object C | Incomplete |
| 4 | + | Update a name of the role A3 | Incomplete |

Hereinafter, the system for deploying a SOA deployment environment model according to an embodiment of the present invention will be described with reference to FIG. 6.

Briefly, the deployment system according to the embodiment of the present invention implements the deployment of the SOA deployment environment model by creating tasks associated with the deployment of the model, adding the created tasks to corresponding elements of the model, and executing the tasks.

Figure 6:
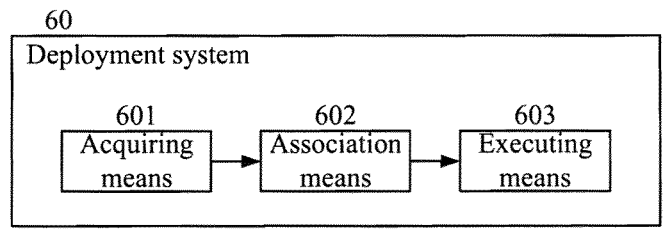
FIG. 6 is a block diagram showing a system for deploying a SOA deployment environment model according to an embodiment of the present invention.

As shown in FIG. 6, the deployment system 60 includes acquiring means 601, association means 602 and executing means 603.

The acquiring means 601 acquires a task list including tasks for deploying elements of the SOA deployment environment model.

As described above, the task list can be created by the developer for the SOA deployment environment model generated in advance and to be deployed, and the task list can include the tasks for deploying the elements of the deployment environment model. The acquiring means 601 can perform the acquiring operation by receiving the task list. In particular, one or more tasks may be created for each element (e.g. role, component, or the like) required to be generated and deployed in order to deploy the SOA deployment environment model. The one or more tasks created for each element and the tasks created for different elements form the task list for deploying the SOA deployment environment model. The created tasks may have three parameters, "Task Status", "Task ID" and "Task Implementation" (see FIG. 1), where "Task Status" indicates completion statuses of the tasks (e.g., "Done" and "Incomplete"), "Task ID" describes actions of the tasks (by a sub-parameter "Signature", e.g., "Generate a role" or the like) and the operation types for the actions (by a sub-parameter "Sign"; for example, a positive sign "+" represents doing the actions and a negative sign "−" represents undoing the actions which have been performed), "Task Implementation" describes how to complete the tasks, for example, describes programming classes or commands required to be invoked and parameters required to be transferred for execution of the actions. The three parameters are the same as those described above with reference to FIG. 3 and may be set in the manner described above, thus detailed descriptions thereof are omitted here to avoid repetition. It is to be recognized that these parameters of the tasks are not limitative, and different parameters may be set for the tasks in other embodiments, as long as the tasks can realize self-description, that is, can describe completion statuses of the tasks, actions to be done or actions to be undone, how to complete the actions, and the like by the set parameters.

The association means 602 associates the tasks in the task list with the elements in the SOA deployment environment model. Thereby, the task list is added to the model. In particular, the association means 602 may associate the tasks with the corresponding elements according to execution objects (elements of the model) of the tasks described in "Signature" thereof. The association means 602 may implement this association by using measures commonly used in the art, and a detailed description thereof is omitted here.

After the association of the tasks is completed, the executing means 603 executes the tasks in the task list to deploy the elements of the SOA deployment environment model, so as to realize the deployment of the SOA deployment environment model.

Specifically, the executing means 603 may execute the actions of the tasks in the manner described above according to directions on how to complete the actions in "Task Implementation" of the tasks, so as to complete the tasks. Since the tasks in the task list are created for deploying the SOA deployment environment model, the deployment of the model is realized after all of the tasks in the task list are executed. For example, after a task "Generate a role", a task "Add the role to a role tier", a task "Generate a component", a task "Add the component to the role" and a task "Map the role to a deployment object" are executed sequentially, deployment of a SOA deployment environment model having the generated role and component onto the deployment object can be realized. During the process of execution of the respective tasks, in order to avoid repeated execution of tasks which have been executed, the executing means 603 may check "Task Status" of the tasks, skip the tasks with "Task Status" of "Done", and execute the tasks with "Task Status" of "Incomplete" and then modify "Task Status" thereof to "Done" after the tasks are executed.

Hereinafter, the system for modifying a deployed SOA deployment environment model according to an embodiment of the present invention will be described with reference to FIG. 7. The system can modify the deployed SOA deployment environment model conveniently when the business changes.

Figure 7:
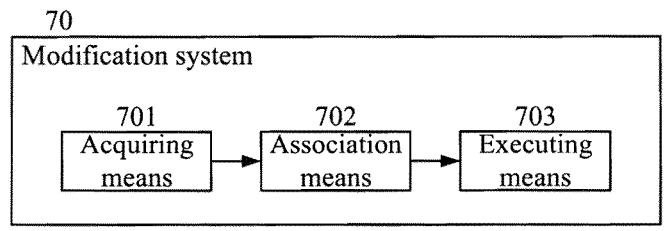
FIG. 7 is a block diagram showing a system for modifying a deployed SOA deployment environment model according to an embodiment of the present invention.

As shown in FIG. 7, the modification system 70 includes acquiring means 701, association means 702, and executing means 703.

The acquiring means 701 acquires a task list including tasks for modifying elements of the SOA deployment environment model.

In particular, when the business changes, it is often necessary to modify certain element(s) of the deployed SOA deployment environment model, so as to modify the deployed deployment environment model. To this end, the task list may be created by the developer, and may include the tasks for modifying the elements of the deployment environment model. The acquiring means may perform the acquiring operation by receiving the task list. Likewise, one or more tasks may be created for modifying a certain element. The task(s) created for each element and the tasks created for different elements form the task list (referred to as "Incremental Task List" for clarity) together. The tasks in the Incremental Task List may include "Task Status", "Task ID" and "Task Implementation". These parameters and their setting methods are the same as those described above with reference to FIG. 5, thus detailed descriptions thereof are omitted here to avoid repetition.

The association means 702 associates the tasks in the Incremental Task List with the elements (i.e., the elements to be modified), so as to add the task list to the deployed SOA deployment environment model. The association means 702 may perform the association in the same manner as the association means 602.

The executing means 703 executes the tasks in the task list (i.e. the Incremental Task List) to modify the elements of the SOA deployment environment model, so as to realize the modification of the deployed SOA deployment environment model. The executing means 703 may execute the tasks in the Incremental Task List in the same manner as the executing means 603. In particular, the executing means 703 may execute actions of the tasks according to directions on how to complete the tasks in "Task Implementation" of the tasks, so as to execute the actions to be performed by the tasks. Likewise, during the process of executing the tasks, the executing means 703 may check completion statuses of the respective tasks associated with the elements of the model to see whether they have been executed or completed, skip the tasks which have been executed, and only execute the tasks which have not been completed and modify "Task Status" thereof to "Done" after the tasks are executed.

In this way, by associating the tasks created for modifying the elements of the deployed SOA deployment environment model with the elements and then executing the tasks, the deployed deployment environment model may be modified easily, so that the modified deployment environment model may adapt to the changed business better.

The method and the system for deploying a SOA deployment environment model according to the embodiments of the present invention, and the method and the system for modifying a deployed SOA deployment environment model according to the embodiments of the present invention may realize, in a top-down style, deployment of the SOA deployment environment model and modification of the deployed SOA deployment environment model in a simple and easy-to-implement manner without complex logics, thereby facilitating deployment and update of the model.

It is to be noted that the above embodiments of the present invention are only illustrative, not limitative. Various modifications may be made to the above embodiments by those skilled in the art without departing from the scope and spirit of the present invention. For example, although the system for deploying a SOA deployment environment model and the system for modifying a deployed SOA deployment environment model are described above as two separate systems, the two systems can be combined into a single system to deploy the SOA deployment environment model and modify the deployed SOA deployment environment model. In addition, at least a part of the respective components of the two systems may be further combined/divided, as long as they can implement the above functions together.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for deploying a Service-Oriented Architecture (SOA) deployment environment model, the system comprising:
   a data processor coupled to a memory having program code that, when executed by the data processor, performs steps comprising:
   acquiring a task list including tasks identifying elements to be deployed as part of the SOA deployment environment model, wherein each task in the task list is an element that describes itself by respective parameters comprising a Task Implementation parameter describing a specification for performing an action of a respective task including indicating programming classes associated with the respective tasks;
   associating each of the tasks in the task list with corresponding elements of the SOA deployment environment model according to a description in a signature sub-parameter of a Task ID parameter of the respective task, wherein the task list is added into the SOA deployment environment model;
   deploying the elements of the SOA deployment environment model to a deployment target, by:
   selectively executing, according to the specification of a respective Task Implementation parameter, only tasks in the task list having a first predetermined status of a Task Status parameter and skipping the tasks in the task list having a second predetermined status of the Task Status parameter, and controlling a sequence of execution of the tasks having the first predetermined status; and
   maintaining a status of a deployed SOA deployment environment model by recording, for each task in the task list, a signature of the task and a task status in a history data structure in the memory.

2. The system of claim 1, wherein the tasks comprise the parameters of the Task Status, the Task ID and the Task Implementation, and wherein the Task Status indicates completion statuses of the tasks, the Task ID indicates actions of the tasks and operation types for the actions, and the Task Implementation further indicates how to complete the actions including specifying the programming classes required to be invoked to complete the action.

3. The system of claim 2, wherein the completion statuses include Done and Incomplete, the operation types for the actions include doing the actions and undoing the actions, and the Task Implementation indicates how to complete the actions by indicating commands required to be invoked and parameters required to be transferred for completion of the actions.

4. The system of claim 3, wherein in the selectively executing only the tasks in the task list, having a first predetermined status of the Task Status parameter and skipping the tasks in the task list, having a second predetermined status of the Task Status parameter, further comprises only the tasks which are Incomplete are executed, and the tasks which are Done are skipped.

5. A system for modifying a deployed Service-Oriented Architecture (SOA) deployment environment model, the system comprising:
   a data processor coupled to a memory having program code that, when executed by the data processor, performs steps comprising:
   acquiring a task list including tasks identifying elements of the deployed SOA deployment environment model of a deployment target to be modified,
   creating an Incremental Task List, wherein each task in the task list is an element that describes itself by respective parameters comprising a Task Implementation parameter describing a specification for performing an action of a respective task including indicating programming classes associated with the respective tasks, and wherein a Task Status parameter for the tasks of the Incremental Task List are initially set to Incomplete;
   associating each of the tasks in the Incremental Task List with corresponding elements of the deployed SOA deployment environment model of the deployment target according to a description in a signature sub-parameter of a Task ID parameter of a respective task, wherein the Incremental Task List is added into the deployed SOA deployment environment model;

modifying the elements of the deployed SOA deployment environment model, by selectively executing, according to the specification of a respective Task Implementation parameter, only tasks in the Incremental Task List having a first predetermined status of the Task Status parameter and skipping the tasks in the Incremental Task List having a second predetermined status of the Task Status parameter, and controlling a sequence of execution of the tasks having the first predetermined status; and maintaining a status of the deployed SOA deployment environment model by recording, for each task in the Incremental Task List, a signature of task and the task status in a history data structure in the memory.

6. The system of claim 5, wherein the tasks comprise the parameters of the Task Status, the Task ID and the Task Implementation, and wherein the Task Status indicates completion statuses of the tasks, the Task ID indicates actions of the tasks and operation types for the actions, and the Task Implementation further indicates how to complete the actions including specifying the programming classes required to be invoked to complete the action.

7. The system of claim 6, wherein the completion statuses include Done and Incomplete, the operation types for the actions include doing the actions and undoing the actions, and the Task Implementation indicates how to complete the actions by indicating commands required to be invoked and parameters required to be transferred for completion of the actions.

8. The system of claim 7, wherein in the selectively executing the tasks in the Incremental Task List, having a first predetermined status of the Task Status parameter and skipping the tasks in the task list, having a second predetermined status of the Task Status parameter, further comprises, only the tasks which are Incomplete are executed, and the tasks which are Done are skipped.

9. A non-transitory computer readable medium having computer readable program code embodied therein, the computer readable program code, for execution by a central process unit, comprising:
first program code configured to acquire a task list including tasks identifying elements of a deployed Service Oriented Architecture (SOA) deployment environment model of a deployment target to be modified, creating an Incremental Task List, wherein each task in the Incremental Task List is an element that describes itself by respective parameters comprising a Task Implementation parameter describing a specification for performing an action of a respective task including indicating programming classes associated with the respective tasks, and wherein a Task Status parameter for the tasks of the Incremental Task List are initially set to Incomplete;

second program code configured to associate each of the tasks in the Incremental Task List with the elements of the deployed SOA deployment environment model of the deployment target according to a description in a signature sub-parameter of a Task ID parameter of a respective task, wherein the Incremental Task List is added into the deployed SOA deployment environment model;

third program code configured to modify the elements of the deployed SOA deployment environment model of the deployment target by
selectively executing, according to the specification of a respective Task Implementation parameter, only tasks in the Incremental Task List having a first predetermined status of the Task Status parameter and skipping the tasks in the Incremental Task List having a second predetermined status of the Task Status parameter, and
controlling a sequence of execution of the tasks having the first predetermined status; and fourth program code configured to maintain a status of the deployed SOA deployment environment model by recording, for each task, in the Incremental Task List, a signature of task and the task status in a history data structure in the memory.

* * * * *